Oct. 19, 1965  L. L. PETTY  3,212,826
SAFETY HYDRAULIC BRAKE SYSTEM
Filed Dec. 16, 1963  3 Sheets-Sheet 1

Letron L. Petty
INVENTOR.

Oct. 19, 1965     L. L. PETTY     3,212,826

SAFETY HYDRAULIC BRAKE SYSTEM

Filed Dec. 16, 1963     3 Sheets-Sheet 2

Letron L. Petty
INVENTOR.

BY *Clarence A. O'Brien*
*and Harvey B. Jackson*
Attorneys

Letron L. Petty
INVENTOR.

3,212,826
Patented Oct. 19, 1965

3,212,826
SAFETY HYDRAULIC BRAKE SYSTEM
Letron L. Petty, Nashville, Tenn., assignor of fifty percent
to William O. Terry, Cookeville, Tenn.
Filed Dec. 16, 1963, Ser. No. 330,705
4 Claims. (Cl. 303—84)

This invention relates to a novel and useful safety hydraulic brake system and more specifically to a hydraulic brake system designed primarily for use as the brake system of a wheeled vehicle although it is to be understood that the fluid system hereinafter set forth may also be utilized in various types of environments.

In a conventional hydraulic brake system of a wheeled vehicle there is provided a master cylinder and one or more wheel cylinders, the wheel cylinders being slave cylinders and operable to apply the brake mechanism of the associated wheel. The outlet of the master cylinder is communicated with the inlet of each wheel cylinder by means of suitable conduits. Inasmuch as the majority of vehicle hydraulic brake systems include a plurality of wheel cylinders which are in constant and direct communication with the master cylinder, should a leak develop in one of the conduits leading to one of the wheel cylinders or one of the wheel cylinders itself, it is impossible to maintain sufficient pressure in any portion of the brake system to apply the brakes of the vehicle.

In recent years some automobile manufactuers have provided hydraulic brake systems including individual portions for actuating the front and rear brakes whereby a leak developing in one portion of the system will not adversely affect the braking power of the remaining portion of the brake system. However, these newer types of vehicle hydraulic brake systems are merely capable of assuring two wheel braking power when the brakes are applied. Should a sudden leak develop in either portion of the brake system servicing the front and rear wheels the leak will not be noticed until such time as it is necessary to apply the brakes, at which time the driver of the vehicle may or may not realize that he has lost either his front or rear brakes. Inasmuch as the rear wheels of a motor vehicle supply only a small fraction of the braking power of the vehicle during an emergency stop, a leak in the portion of the brake system servicing the rear wheels could go unnoticed for some time. Of course, should the leak occur in the portion of the brake system servicing the front wheels, the driver of the vehicle, upon applying the brakes, will most certainly be aware that there is some type of brake failure inasmuch as his braking power will be substantially reduced. In any event, the newer types of hydraulic brake systems including means for separate actuation of the front and rear wheel brakes by the master cylinder are not capable of rendering a signal when a slow leak occurs in any portion of the system and are further incapable of giving an indication of any leak before the brakes are applied.

It is accordingly the main object of this invention to provide a safety hydraulic brake system of the type including separate sections for simultaneous actuation of the front and rear wheels of a motor vehicle with means being provided for automatically terminating communication between either section of the system and the master cylinder as soon as a leak develops in that section thereby enabling the operation of the remaining section without undue loss of hydraulic fluid or adverse effects on the remaining section, and further including means for immediately rendering a warning to the driver of the vehicle should either a slow or major leak occur in either section.

Still another object of this invention is to provide a safety hydraulic brake system including means by which the presence of a leak in either portion of the hydraulic brake system is indicated before it becomes necessary to apply the brakes.

Yet another object of this invention is to provide a safety hydraulic brake system constructed in a manner whereby the novel components thereof may be readily installed in an existing hydraulic brake system thereby enabling the modification of existing hydraulic brake systems in accordance with the present invention.

Another object of this invention is to provide a safety hydraulic brake system in accordance with the preceding objects whose novel components may be readily manufactured at a relatively low cost.

A still further object of this invention is to provide a safety hydraulic brake system including means by which failure of either portion of the hydraulic system may be indicated by means of a visual or audible alarm device.

A final object of this invention to be specifically enumerated herein is to provide a safety hydraulic brake system in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
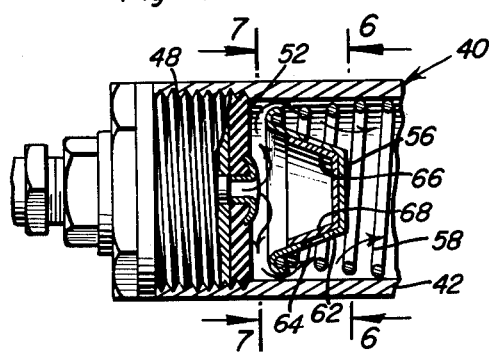
FIGURE 5 is a fragmentary view similar to that of FIGURE 4 and showing the movable portions of the second component in different positions of operation.
Figure 6:
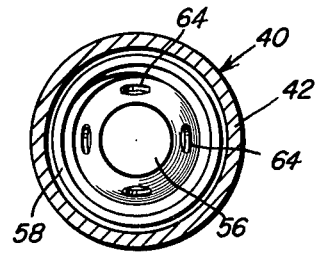
Figure 7:
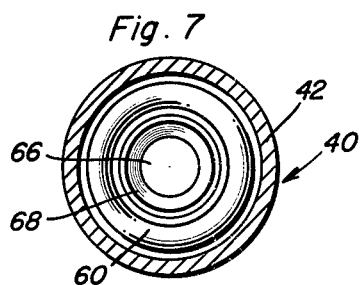
Figure 8:
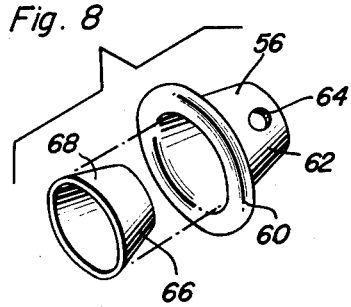

FIGURES 6 and 7 are transverse vertical sectional views taken substantially upon the planes indicated by the section lines 6—6 and 7—7 respectively of FIGURE 5;

FIGURE 8 is an exploded perspective view of one of the valve assemblies of the second component; and FIGURE 9 is an exploded perspective view of the movable portions of the first component.

With reference now more specifically to the drawings the numeral 10 generally designates a conventional form of motor vehicle including a main frame 12 from which front and rear supporting wheels 14 and 16, respectively, are supported in any convenient manner. The front wheels 14 include front brake mechanisms 18 and the rear wheels 16 include rear brake mechanisms 20.

Each of the brake mechanisms 18 and 20 includes a pair of brake shoes which is pivotally supported as at 24 at its lower ends and has a wheel cylinder 26 interposed between its upper ends, the wheel cylinders 26 each having a pair of pistons therein in its opposite ends and a center inlet opening whereby a supply of fluid under pressure to each wheel cylinder 26 will effect movement of the pistons (not shown) away from each other and the urging of the upper ends of the brake shoes 22 away from each other to apply the associated brake mechanism.

The hydraulic brake system generally referred to by the reference numeral 28 of which the shoes 22 and wheel cylinders 26 comprise a part includes a master cylinder 30 having an outlet line 32. In addition, a pair of branch conduits 34 and 36 leading to the front brake mechanisms 18 and the rear brake mechanisms 20 respectively are also provided and it is to be understood that in conventional brake systems the outlet end of the outlet line or supply line 32 is communicated with the inlet ends of the branch conduits 34 and 36. Accordingly, it may be seen that a leak in either of the branch conduits 34 and 36 will effect the entire brake system 28 and that if the leak is severe enough it will be impossible to maintain sufficient pressure in any one portion of the brake system 28 to apply the brake mechanisms 18 and 30. The fluid brake system 28, however, includes a fluid check valve assembly generally referred to by the reference numeral 40 and a pressure sensitive actuating mechanism generally referred to by the reference numeral 41.

Figure 2:
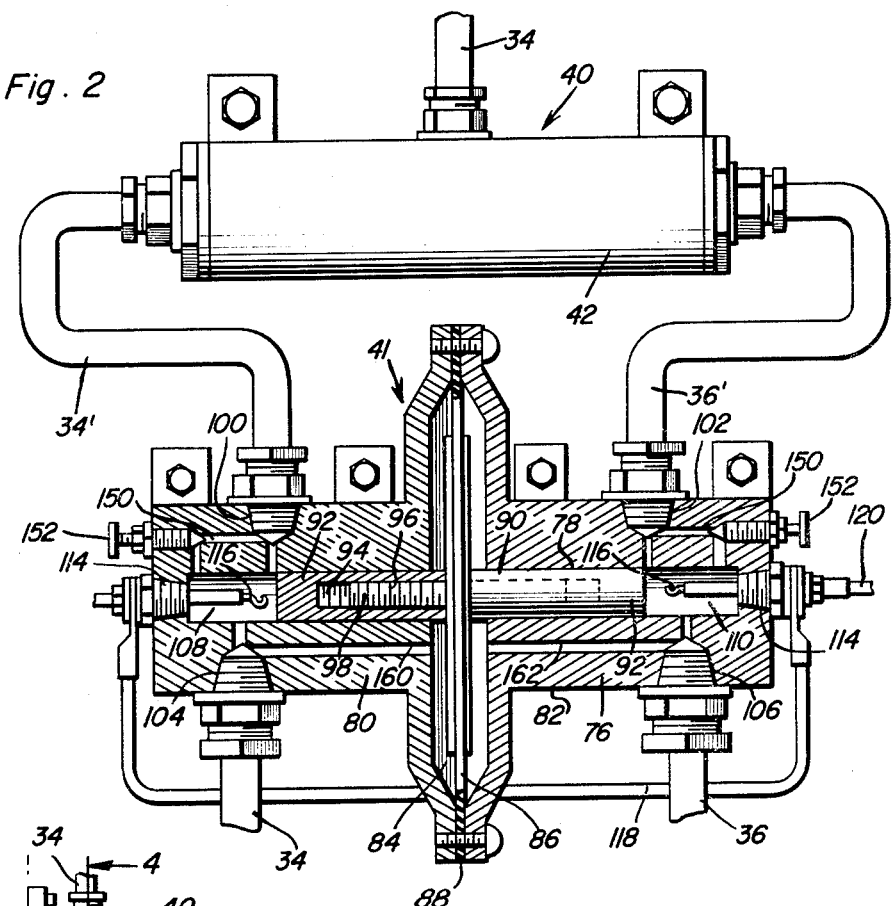
FIGURE 2 is a side elevational view of the novel components of the instant invention which may be incorporated into a conventional hydraulic brake system for modifying the conventional brake system in accordance with the present invention, one of the two novel components being shown in vertical section taken substantially upon a plane passing through the longitudinal center line thereof.
Figure 3:
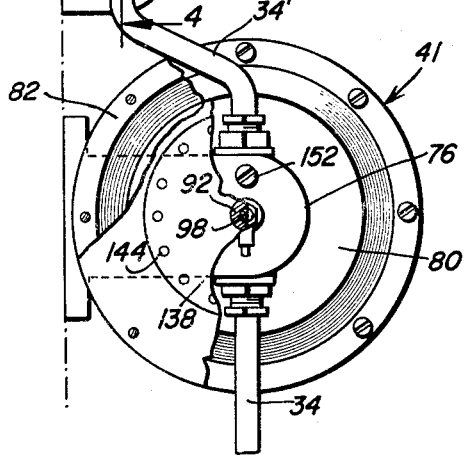
FIGURE 3 is a front elevational view of the assemblage illustrated in FIGURE 2 shown on somewhat of a reduced scale and a portion of one of the components being broken away and shown in section.
Figure 4:
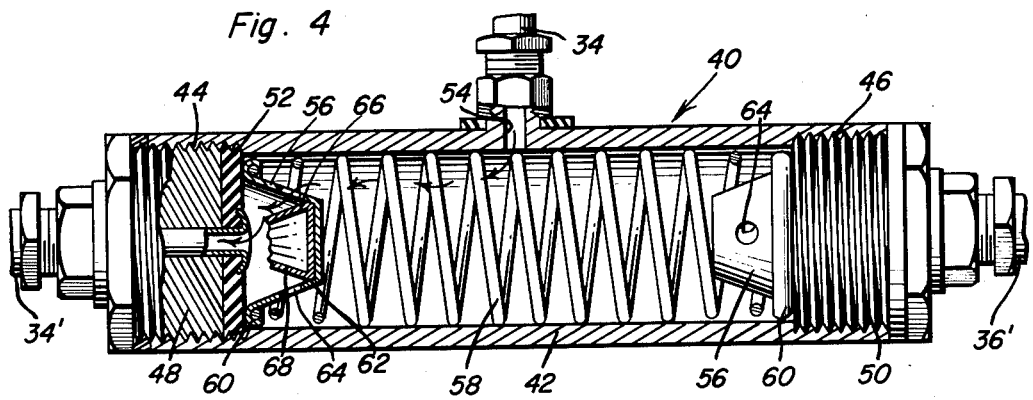
FIGURE 4 is a vertical longitudinal sectional view on somewhat of an enlarged scale of the second component illustrated in FIGURE 2 taken substantially upon a plane passing through the longitudinal center line of the second component.

With attention now directed more specifically to FIGURES 2 and 4 of the drawings it may be seen that the fluid check valve assembly 40 comprises an elongated cylinder 42 whose opposite ends are internally threaded as at 44 and 46 and have outlet fittings 48 and 50 respectively threadedly engaged therein. The inner end faces of the outlet fittings 48 and 50 are each provided with a sealing washer 52 and the cylinder is provided with a center inlet opening 54 which opens through one side of the cylinder 42. The outlet end of the supply line 34 is sealingly communicated with the inlet opening 54 and thereby communicates the interior of the cylinder 42 with the outlet of the master cylinder 30.

Figure 1:
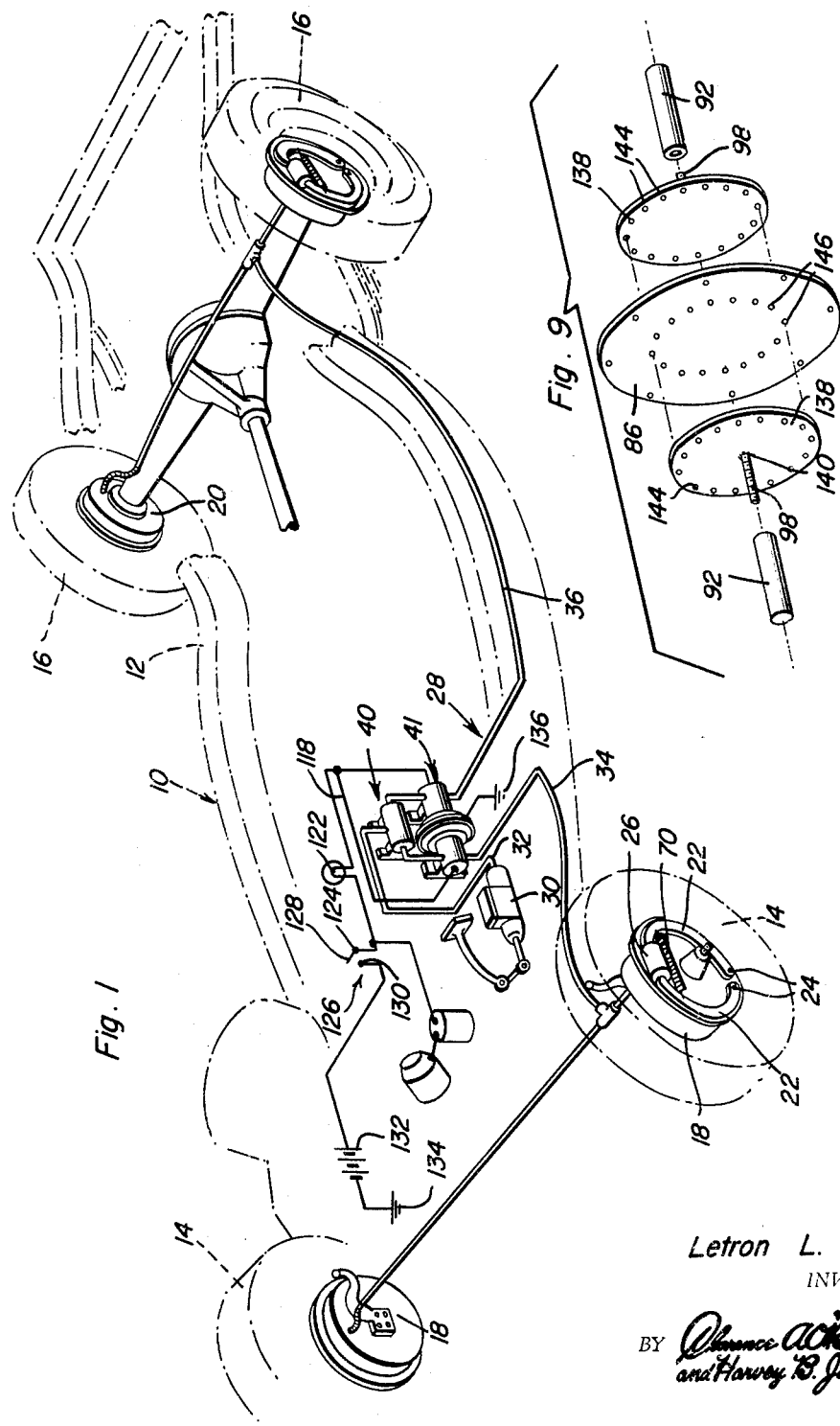
FIGURE 1 is a diagrammatical view in perspective of the safety hydraulic brake system of the instant invention shown operatively associated with the four wheel brakes of a conventional form of motor vehicle, portions of the motor vehicle being broken away and shown in phantom lines.

A pair of sealing cups 56 are disposed in the opposite ends of the cylinder 42 and open outwardly toward the corresponding sealing washer 52. A compression spring 58 is disposed between the curled major diameter lip portions 60 of the sealing cups 56 and therefore yieldingly urges the open ends of the sealing cups into fluidtight sealing engagement with the associated sealing washers 52. However, the side walls 62 of the sealing cups 56 are provided with a plurality of apertures or ports 64 and an inner resilient sealing cup 66 is secured in each of the sealing cups 56 for preventing a reverse flow through the sealing cups 56 unless the sealing cups 56 are unseated from seated engagement with the sealing washers 52. Accordingly, when hydraulic fluid enters the cylinder 42 under pressure from the master cylinder 30, the greater static pressure outside the sealing cups 56 causes the side walls 68 of the resilient sealing cups 66 to be deflected radially inwardly thereby uncovering the apertures or ports 64 and allowing the hydraulic fluid to pass through the sealing cups 56 and outwardly of the outlet fittings 48 and 50. However, with attention now directed to FIGURE 5 of the drawings, it may be noted that a reverse flow of hydraulic fluid past the sealing cups 56 and 66 is prevented when the resilient side walls 68 of the resilient sealing cups 66 are disposed in surface to surface contacting relation with the inner surfaces of the side walls of the sealing cup 56 unless the sealing cups 66 are unseated from engagement with the sealing washers 52. With attention again directed now to FIGURE 1 of the drawings it will be noted that an expansion spring 70 is interconnected between the upper ends of each pair of shoes 22 to yieldingly urge the upper ends of the shoes toward each other thereby normally also functioning to urge the opposing pistons (not shown) in the wheel cylinders 26 toward each other. The movement of the opposing pistons in the wheel cylinders 26 toward each other by means of the expansion springs 70 causes a major portion of the hydraulic brake fluid in the wheel cylinders 26 to be forced backward through the branch conduits 34 and 36 and the outlet fittings 48 and 50 and into the supply line 34. However, inasmuch as the expansion springs 70, when expanded, effect a greater pressure within the wheel cylinders 26 than that which may be held back by the compression spring 58, upon initial retraction of the brake shoes 22 and the movement of the opposed pistons in the wheel cylinders 26 toward each other, the sealing cups 56 will be unseated from the sealing washers 52 thereby enabing some of the hydraulic fluid within the branch conduits 34 and 36 to pass through the cylinder 42 and into the supply line 34. Further, inasmuch as the strength of the expansion springs 70 steadily diminishes upon the reduction of the length of the springs 70 and the compression spring 58 is capable of urging the sealing cups 56 into engagement with the sealing washers 52 a sufficient force to overcome the return pressure of the hydraulic fluid effected by the expansion springs 70 when they are partially relaxed, before the brake shoes 22 are fully returned to their rest positions by swinging movement of the upper ends thereof together, the sealing cups 56 will seat against the sealing washers 52 and prevent further rearward flow of hydraulic fluid through the cylinder 42 and into the supply line 34. Therefore, the expansion springs 70 maintain a static pressure within the branch conduits 34 and 36 when the brakes are not being applied, there being no static pressure in the cylinder 42 outside of the cups 56.

With attention now directed more specifically to FIGURE 2 of the drawings it may be seen that the pressure sensitive actuating means 41 comprises an elongated housing 76 which defines a bore 78 extending longitudinally therethrough. The housing 76 is formed of two housing halves 80 and 82 and the housing halves abut each other to form diametrically enlarged center cavity 84 in which a flexible diaphragm 86 is disposed, the outer peripheral edge portions 88 of the flexible diaphragm being secured between the abutting end faces of the housing halves 80 and 82. An elongated piston 90 is reciprocal in the bore 78 and is secured to the diaphragm 86 in sealed relation therewith. The piston 90 includes a pair of end caps 92 having opposing blind bores 94 formed therein in which the externally threaded opposite end portions 96 of a pair of axially aligned shank members 98 projecting from opposite sides of the diaphragm 86 are threadedly engaged. The branch conduits 34 and 36 include short sections 34' and 36' which extend from the outlet fittings 48 and 50 and are sealingly secured in the inlet openings 100 and 102 which open inwardly into the opposite ends of the bore 78. The inlet ends of the portions of the branch conduits 34 and 36 disposed between the housing 76 and the wheel cylinders 26 are sealingly secured in outlet openings 104 and 106 which also open inwardly of the opposite ends of the bore 78.

With the piston 90 disposed in its normal position illustrated in FIGURE 2 of the drawings, a pair of pressure chambers 108 and 110 are defined by the opposite ends of the bore 78 beyond the opposite ends of the piston 90. The pressure chambers 108 and 110 communicate the short sections 34' and 36' with the remainder of the branch conduits 34 and 36 respectively and as long as the static pressure of the hydraulic fluid within the pressure chambers 108 and 110 remains the same, the piston 90 will remain in its centered rest position by means of the resiliency of the diaphragm 86. However, should there occur a leak in either of the branch conduits 34 and 36, including the short sections 34' and 36' respectively, the static pressure within the corresponding pressure chamber will be reduced whereupon the greater pressure in the other pressure chamber will effect movement of the piston 90 toward the outer end of the pressure chamber having the reduced hydraulic pressure therein.

The extreme opposite ends of the bore 78 are diametrically reduced and are internally threaded as at 114 and have electrical terminal means 116 insulatively secured therein, the electrical terminal means projecting inwardly of the chambers 108 and 110 and toward the corresponding end of the piston 90. The electrical terminal means 116 are electrically connected by means of a suitable conductor 118 and a conductor 120 is electrically connected to one of the electrical terminal means 116 and has an electrical resistance type lighting element 122 serially disposed therein, the conductor 120 also leading to a terminal 124 of the ignition switch 126 of the vehicle 10 which may have its bridging element 128 closed so as to contact the terminal 130 and electrically connect the conductor 120 to the source of electrical potential 132, the latter being grounded at 134 and the housing 76 being ground at 136, the grounds 134 and 136 being common.

With attention now directed to FIGURE 9 of the drawings, it may be seen that the end caps 92 are threadedly engaged on the shank members 98 which are in turn fixedly secured to corresponding mounting disks 138 in any convenient manner such as by welding 140, the mounting disks 138 being secured to opposite sides of the diaphragm 86 in any convenient manner such as by any suitable fasteners (not shown) secured through the aligned apertures 144 formed in the mounting disks 138 and the apertures 146 formed in the diaphragm 86.

With attention now again directed to FIGURE 2 of the drawings it may be seen that the longitudinal extent of the center cavity 84 is sufficient to enable the end cap 92 of the piston 90 to terminate communication between one of the branch conduits 34 and 36 and its corresponding short section upon reduction of fluid pressure within the corresponding pressure chamber. In this manner, not only will the end of the piston 90 engage the electrical terminal member 116 disposed in the pressure chamber having the reduced fluid pressure therein, but the piston 90 will terminate communication of the portion of the hydraulic brake system 10 having the reduced pressure therein and the supply line 32. In this manner, loss of hydraulic brake fluid due to a leak will be substantially eliminated.

It will further be noted that the housing 76 includes a pair of by-pass passages 150 and suitable valve elements 152 therefor for opening and closing the by-pass passages 150 as desired, the distance between the mounting plates 138 and the end of the associated housing halves 80 and 82 when the diaphragm 86 is in the neutral position being less than the distance between the ends of the piston 90 and the outlet openings or ports 104 and 106 at the point with which they communicate with the bore 78, the abutment of the mounting plates 138 with the opposing ends of the housing halves 80 and 82 thereby eliminating the closing of the outlet ports or openings 104 and 106.

It may also be noted from FIGURE 2 of the drawings that the housing halves 80 and 82 include passages 160 and 162 which communicate the portions of the center cavity 84 on opposite sides of the diaphragm 86 with the outlet openings or ports 104 and 106 and therefore with the pressure chambers 108 and 110 respectively. Therefore, not only is the hydraulic pressure in the branch conduits 34 and 36 applied to the end caps 92 of the piston 90, but also to opposite sides of the diaphragm 86.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automotive safety device adapted to be incorporated into the fluid operated vehicle brake system having a source of fluid pressure and a plurality of fluid brake operating cylinders comprising a fluid check valve housing having a fluid inlet opening adapted to be connected to the source of fluid pressure, a pair of spaced fluid outlet openings, a check valve assembly disposed within the housing and including means adjacent each of the outlet openings for controlling the flow of fluid therethrough, each of said means including a washer having an opening in alignment with the fluid outlet opening, sealing means normally in engagement with the washers, fluid openings in the sealing means and resilient means normally closing the last mentioned openings, biasing means urging the sealing means into engagement with the washers, conduit means extending from the outlet openings, a pressure sensitive means comprising a housing having spaced inlet openings communicating with the conduit means and spaced outlet openings each adapted to be connected to at least one of the brake operating cylinders, and further including means responsive to a reduction in fluid pressure to terminate communication between one of the last-mentioned inlet and outlet openings to insure braking of the vehicle by the actuation of at least one of the other brake cylinders, and wherein the last recited means comprises a movable partition disposed between a respective pair of the inlet and outlet openings, cut-off means disposed on each side of the partition and adapted to be moved between one of said respective pairs upon a decrease in fluid pressure on said one side of the partition.

2. The device of claim 1 wherein the partition is a flexible diaphragm.

3. The device of claim 1 wherein each of the sealing means is comprised of a cup-shaped member having its opening facing the outlet opening and having a curled lip about its perimeter within which the biasing means are seated for urging the cup-shaped member against the washer.

4. A safety valve to be used in a vehicle having a brake system including wheel brake cylinders, a source of fluid pressure for actuating the wheel cylinders and a pressure sensitive means controlling flow of fluid to the wheel cylinders which is effective to stop the flow of fluid thereto upon a decrease in fluid pressure, said valve comprising a housing, a fluid inlet opening therein adapted to be connected to a source of fluid pressure, a pair of spaced fluid outlet openings adapted to be connected to the pressure sensitive means, a check valve assembly disposed within the housing and including means for controlling the flow of fluid through the outlet openings, said last-mentioned means including a means adjacent each of the outlet openings for controlling the flow of fluid therethrough, each of said fluid flow controlling means including sealing means normally in engagement with the fluid outlets, fluid openings in the sealing means, resilient means normally closing the last-mentioned openings, and a single biasing means urging the sealing means into engagement with the outlet openings.

References Cited by the Examiner

UNITED STATES PATENTS

| | | | |
|---|---|---|---|
| 2,637,977 | 5/53 | Seppmann | 60—54.6 |
| 2,730,410 | 1/56 | Phillips | 303—84 |
| 2,899,024 | 8/59 | Hamilton et al. | 303—84 |
| 2,979,365 | 4/61 | Jones | 303—84 |
| 2,992,652 | 7/61 | Fellberg | 303—84 |
| 3,107,681 | 10/63 | May | 303—14 |

A HARRY LEVY, *Primary Examiner.*

EUGENE G. BOTZ, *Examiner.*